July 29, 1930.    J. C. BOURQUIN    1,771,950
TIRE CHAIN END HOOK
Original Filed Jan. 28, 1928
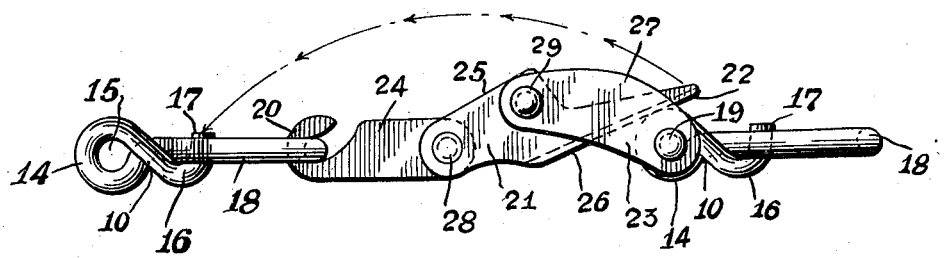
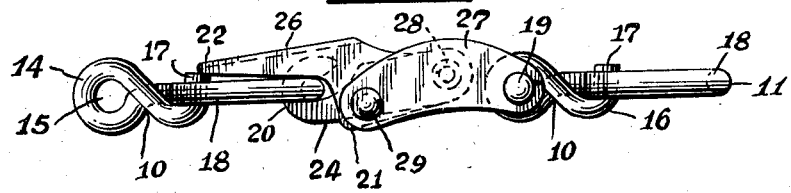
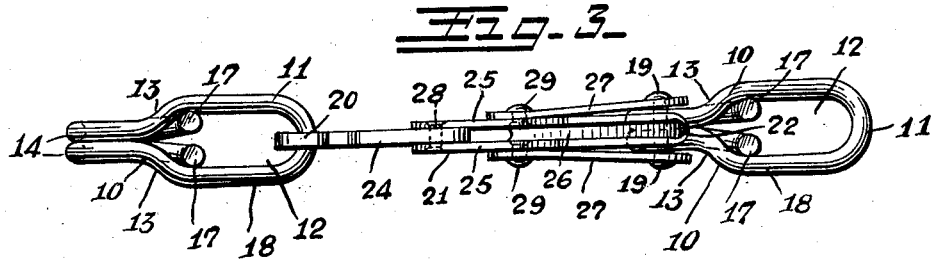
INVENTOR.
Jule C. Bourquin,
BY Louis M. Schmidt
ATTORNEY Patented July 29, 1930

1,771,950

UNITED STATES PATENT OFFICE

JULE C. BOURQUIN, OF NEWINGTON, CONNECTICUT

TIRE-CHAIN END HOOK

Application filed January 28, 1928, Serial No. 250,195. Renewed December 19, 1929.

My invention relates to improvements in tire chain end hooks for use in connecting the ends of the side chains of anti-skidding devices that are used on automobile wheels, and the object of my improvement is to produce a tire chain end hook that is adapted to serve for the purpose of connecting the ends of such side chains and also that will serve as a means for effecting an appreciable and effective tightening of said side chains by reason of the shortening of the overall length in changing from the open and engaging position of the parts to the closed and locking position, and which change is readily made by the manipulation of the device through the medium of a handle part that is relatively easily accessible for convenience in operation.

In the accompanying drawing:—

Figure 1 is a side elevation of one of my improved tire chain end hooks and a link of the side chain connected one to each end thereof, and with the end hook in the open or elongated position, a broken line indicating diagrammatically the line of travel of one point of the handle from such open or elongated position to the closed or locking position.

Figure 2 is a similar view with the parts in the closed or locking or tightening position.

Figure 3 is an edge view of the same, the parts being in the position that is shown in Fig. 2.

My improved tire chain end hook is used to connect the ends of the side chains of an anti-skidding device for use on the wheels of automobiles. Such an anti-skidding device comprises a pair of side chains, located adjacent the opposite faces of the wheel, and a set of cross-chains or tread members inter-connecting the two side chains.

While my improved end hook is adapted for use with side chains that are made up of links of various forms, it is well adapted for use with links 10 such as are shown in the drawing, there being one link 10 at each of the ends of the end hook structure.

The link 10 is made of a single piece of wire that is bent symmetrically and with the middle portion 11 thereof formed into a relatively large loop that encloses a correspondingly large open space 12. The strands 13 extending from the arms of the loop 11 are brought together to close the loop, are extended away from said loop 11, and are curled around to form circular eyes 14 that are located side by side and having openings 15 in registration, the axes of said openings 15 being substantially transverse relatively to that of the opening 12 of the loop 11. The stands 13 are finally curled further through the loop 11 in the form of hooklike ends 16, the tip end faces 17 projecting slightly beyond the adjacent wire portion 18 of the loop 11.

The openings 15 of the right-hand link 10 shown in the drawing are utilized for making a fixed connection with the structure of the tire chain end hook by means of the pivotal pin 19.

At the left end the end hook is provided with an end structure in the form of a hook 20 by means of whch a separable connection is made with the adjacent end link 10 of the side chain.

The end hook is made up of jointed structures, consisting of three sections that in the opened or elongated position at which the connection and disconnection are effected are arranged generally in series or in extended form and that in the closed or locking or tightening position are arranged generally overlapping.

To permit of effecting the arrangements mentioned the different sections are made different one from the other. This applies particularly to the closed position, as this involves a nesting of the parts one within the other.

The key part is the middle or intermediate section 21, which is provided with the handle 22.

The key section proper 21 as a geometrical proposition comprises the structure that extends between the axes of the two pivotal connections, respectively, the one with the inner or fixed section 23, and the other with the outer or free end section 24 that has the hook 20. Structurally, said key section 21 is generally of channel form, composed of the side members 25 that are interconnected by the yoke portion 26. In the closed position the hook section 24 is received between the side members 25 and said side members 25 themselves are received between other side members or side plates 27 that compose the fixed section 23.

The hook section 24 is in the form of a plain flat link that has the hook 20 at the free end and at the inner end is connected to the side members 25 by means of the single pivotal pin 28.

The two side plates 27 composing the fixed section 23 are operatively connected to the adjacent end link 10 by means of the single pivotal pin 19 already mentioned. The outer ends of said side plates 27 are individually connected to the adjacent side member 25 in any proper manner, as by means of a short pivotal pin 29.

The yoke portion 26 may be extended beyond the pivotal connections of the middle section 21 so as to provide an extension 22 that is suitable for use as a handle for manipulating the parts. Also, said handle 22 or the adjacent portions of the side members 25 may serve as stop devices, particularly in the closed or tightening position, for resisting the strain under operating conditions.

The parts are constructed and arranged so that in changing from the open to the closed position there is a passing-of-the-center effect so that in such closed or holding position any strain to which the side chain and the end hooks are subjected serves to more firmly lock the end hook parts, all of which is resisted by the limiting or stopping effect of the handle structure 22 in one way or another.

As shown in Fig. 2 the cooperating stop device that limits the movement of the handle 22 is some part of the adjacent chain link 10.

An important detail to be considered is the spacing between adjacent cross-chains or tread members of the anti-skidding device.

It is desirable and generally essential for proper operation that the end hook structure will be admissable within this space between adjacent chains or tread members and the structure described has been made to do this. Also, in connection with providing for this condition, the structure serves to provide the maximum throw or tightening effect.

In practical use it is preferable to have the end hook arranged so that the handle member operates in a plane towards and away from the face of the wheel.

Under conditions of use, with the parts in folded position and subjected to strain by the ends, the handle is subjected to forcible contact with some part of the opposed and adjacent end link 10. As shown, the tip end of the handle makes contact with the butt end faces of the wire that is bent and folded to form the said end link 10; the body of the handle extends over and above the structure of the loop 11 and in slightly spaced relation to the strands of the wire that form the said loop 11; and thus the handle is positioned clear of the loop and located for convenient grasping for manipulation for opening the end hook.

Also, in the position of the handle described and shown particularly in Fig. 2, the relatively enlarged trunnion-eyes 14 are located outwardly beyond the tip end of the handle 22 and serve as a guard or protection for the same against accidental contacts with external objects that might result in opening the end hook.

The end link 10 is of the form that is regularly used or standard for side chains and the end hook shown and described has been constructed and arranged for cooperating therewith in the manner described and also for cooperating with such side chain structure as a whole.

As to the latter, the spacing between cross-chains or tread members has been mentioned and which is generally limited and defined. Thus there may be fourteen such cross-chains and the end hook must be limited in its span to the spacing intermediate a pair of such cross-chains.

This condition is effected by avoiding excessive length of the sections for the end hook as one detail.

Another detail comprises connecting the fixed end of the end hook directly with the adjacent end link 10, as shown, by means of the pintle pin 19.

Thus the end hook is fixedly connected with the adjacent fixed end link 10 by one end and at the other end is separably connected to the free end link 10 by means of the free end hook 20. The said adjacent end links 10 are virtually a part of the end hook connecting structure and the operative overall length includes these links. This overall length must be not greater than the spacing between adjacent cross-chains and the parts are constructed and arranged to meet this condition.

Thus the length of the sections is determined and is limited, being relatively short as compared with devices of similar character and used for other purposes, such for instance as the hame-fastener in Patent No. 812,649, February 13, 1906.

By making the handle 22 correspondingly short it cooperates with the end link 10 in the manner described to obtain the guarding effect and the positioning for manipulation.

As a practicable working condition I have found it desirable to make the effective length between the end bearings of the fastener member or tightener of the end hook structure when in the closed or tightening position of the parts to be substantially equal to the effective length between end bearing parts of the links with which it is associated, and this is precisely the arrangement that has been followed in the structure that is shown.

The end hook or fastener may be brifly described as a three section foldable fastener.

As to the links shown, and which, as mentioned, may be regarded as standard in form, they may be designated as of bent wire form, as distinguished from welded links, and having a flat loop at one end, as distinguished from a curbed link. At the other end is a trunnion bearing for a bar or pin of the connected member.

The handle-stop, an extension of one of the sections, projects beyond the adjacent end bearing part, the latter being the end hook that engages with the bar of the loop of the cooperating link 10, but is shorter than said link 10 and terminates short of the trunnion portion of said link, and thus terminates short of any and all working parts that may be connected to said trunnion.

Usually the part directly connected to the trunnion portion, formed by the circular eyes 14, is the bar portion of the loop 11 of the next link 10, but sometimes indirectly connected therewith there may be cross-chain hooks or the like that are engaged with said loop 11.

I claim as my invention:—

1. In an anti-skidding device composed of a pair of side chains and circumferentially spaced cross-chains that inter-connect said side chains, said side chains comprising each a pair of end links that are located between adjacent cross-chains, that are opposed one to the other and in spaced relation, and a fastener operatively connecting said end links, said fastener being of three section foldable form, one end of said fastener being directly connected to one of said end links by a pivotal pin, the other end of said fastener being of hook-form for separable connection with the other of said end links, said other end link being of interlocked wire form, having a U-form at one end for cooperating with said hook, having trunnions for the next link at the other end, and having wire ends that extend from the structure of said trunnions inwardly, that curve around the adjacent wire portions, and that terminate adjacent the adjacent faces of the arms of said U-form, one of said sections having an extension that serves as a handle and also as a stop member in the closed position of the fastener, and the parts being constructed and arranged so that in such closed position said handle is adapted to abut against the end faces of said wire ends.

2. In an anti-skidding device as described in claim 1, said handle being of channel shell-like form for enclosing and housing the edge portion of the structure of said hook in such closed position, and said edge portion comprising the open-mouth or receiving portion of said hook, the handle serving to close or bridge the receiving gap of the hook.

JULE C. BOURQUIN.